US009077540B2

(12) United States Patent
Puiggalí Allepuz et al.

(10) Patent No.: US 9,077,540 B2
(45) Date of Patent: Jul. 7, 2015

(54) METHOD FOR VERIFICATION OF DECRYPTION PROCESSES

(75) Inventors: Jordi Puiggalí Allepuz, Sant Cugat del Valles (ES); Sandra Guasch Castelló, Eivissa (ES); Francesc Sebé Fexias, Mollerussa (ES); Josep M. Miret Biosca, Lleida (ES)

(73) Assignee: Scytl Electronic Voting, S.A. (ES)

( * ) Notice: Subject to any disclaimer, the term of this patent is extended or adjusted under 35 U.S.C. 154(b) by 97 days.

(21) Appl. No.: 13/319,164

(22) PCT Filed: Dec. 11, 2009

(86) PCT No.: PCT/ES2009/000568
§ 371 (c)(1),
(2), (4) Date: Dec. 6, 2011

(87) PCT Pub. No.: WO2010/128172
PCT Pub. Date: Nov. 11, 2010

(65) Prior Publication Data
US 2012/0144186 A1    Jun. 7, 2012

(30) Foreign Application Priority Data
May 5, 2009   (ES) .................. 200901196

(51) Int. Cl.
H04L 9/00     (2006.01)
H04L 9/32     (2006.01)
H04L 9/30     (2006.01)

(52) U.S. Cl.
CPC ............ *H04L 9/3218* (2013.01); *H04L 9/3013* (2013.01); *H04L 2209/42* (2013.01); *H04L 2209/463* (2013.01)

(58) Field of Classification Search
None
See application file for complete search history.

(56) References Cited

U.S. PATENT DOCUMENTS

| 2002/0169971 A1* | 11/2002 | Asano et al. ................. 713/193 |
| 2003/0041244 A1* | 2/2003 | Buttyan et al. ................ 713/172 |
| 2006/0262933 A1* | 11/2006 | Furukawa ..................... 380/281 |
| 2011/0107105 A1* | 5/2011 | Hada ........................... 713/176 |

OTHER PUBLICATIONS

Zweirko; Kotulski A; "A Light-Weight e-Voting System with Distributed Trust" Electronic Notes in Theoretical Computer Science, vol. 168, pp. 109-126, ISSN 1571-066, doi: 10.1016/j.entcs.2006.12.004, Feb. 16, 2007.*

(Continued)

*Primary Examiner* — David Le
(74) *Attorney, Agent, or Firm* — Hess Patent Law Firm; Robert J. Hess

(57) ABSTRACT

The present invention describes a verification method which allows to ensure that the decryption process has been done honestly by the entity in charge of that.

The method described in this invention is characterized by basing the verification of the correctness of the decryption of a set of encrypted messages in a proof demonstrating that the result of the operation with an operator $\phi$ of blocks of encrypted messages is equal to the encryption of the result of operating with the operator $\Theta$ blocks composed by the same messages, decrypted. In order to do that, a first input integrity proof is generated for each block of encrypted messages based on the operation $\phi$ of the encrypted messages, and the link with the output integrity proofs generated with the operation $\Theta$ of the decrypted messages composing each block is verified.

18 Claims, 5 Drawing Sheets

(56) References Cited

OTHER PUBLICATIONS

Zwierko, Kotulski A; "A Light-Weight e-Votinig System with Distributed Trust" Electronic Notes in Theoretical Computer Science. Feb. 16, 2007, vol. 168 pp. 109-126, ISSN 1571-066 doi:10.1016/j.entcs.2006.12.004.

Abe, Masayuki. Universally verifiable MIX with verification work independent of the number of MIX servers. In Nyberg [126], pp. 437-447.

Chaum, David. Untraceable electronic mail, return addresses, and digital pseudonyms. Commun. ACM, 24(2):84-88, 1981.

Chaum, David. Secret-ballot receipts: True voter-verifiable elections. IEEE Security & Privacy vol. 2, Issue: 1 pp. 38-47, Jan.-Feb. 2004.

Fujioka, A.; Okamoto, T. and Ohta, K. "A practical secret voting scheme for large scale election", Advances in Cryptology—Auscrypt'92, LNCS 718, Springer-Verlag, pp. 244-260, 1992.

Golle, P; Zhong, S; Boneh, D, et al. Advances in Cryptology—Asiacrypt 2002, Proceedings. vol. 2501, pp. 451-465. Published: 2002.

Jakobsson, Markus; Juels, Ari; and Rivest, Ronald L. Making mix nets robust for electronic voting by randomized partial checking. In Dan Boneh, editor, USENIX Security Symposium, pp. 339-353. USENIX, 2002.

Neff; Andrew C. A verifiable secret shuffle and its application to evoting. In CCS '01, pp. 116-125, 2001.

Park, Choonsik; Itoh, Kazutomo; and Kurosawa, Kaoru. Efficient anonymous channel and all/nothing election scheme. In Tor Helleseth, editor, Eurocrypt, vol. 765 of Lecture Notes in Computer Science, pp. 248-259. Springer, 1994.

Sako, Kazue and Kilian, Joe. Receipt-free mix-type voting scheme—a practical solution to the implementation of a voting booth. In Louis C. Guillou and Jean-Jacques Quisquater, editors, Eurocrypt, vol. 921 of Lecture Notes in Computer Science, pp. 393-403. Springer, 1995.

* cited by examiner

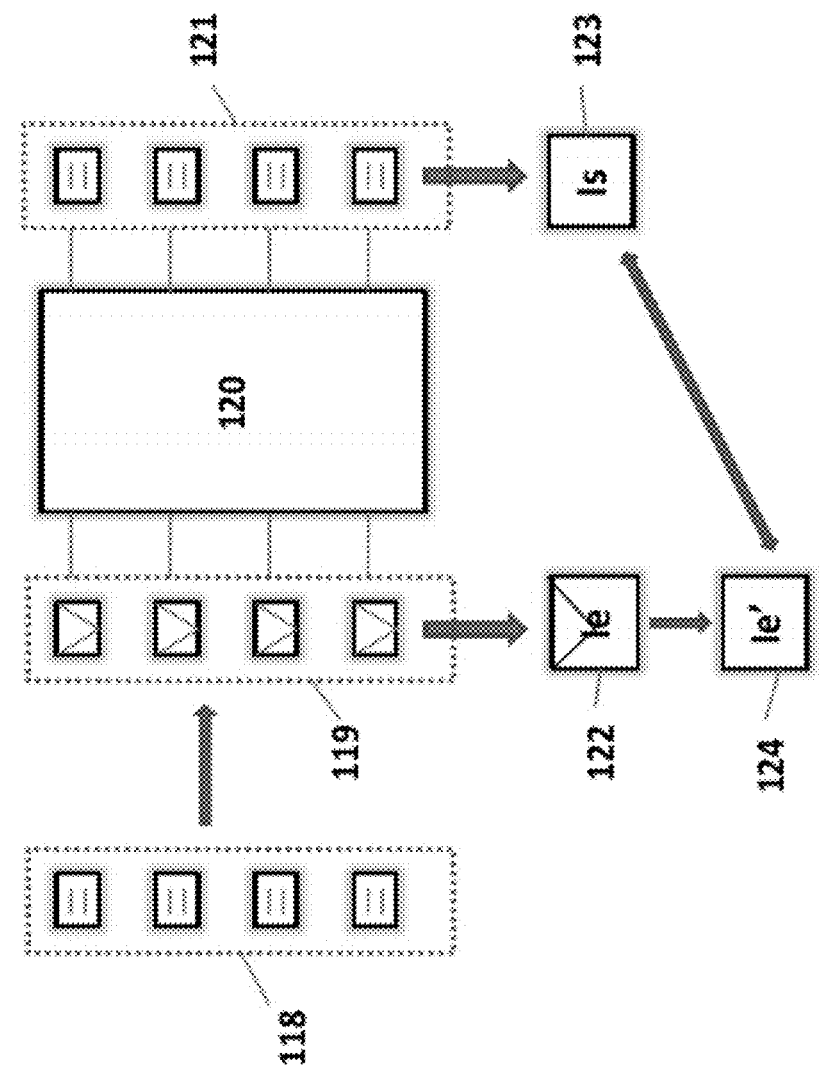

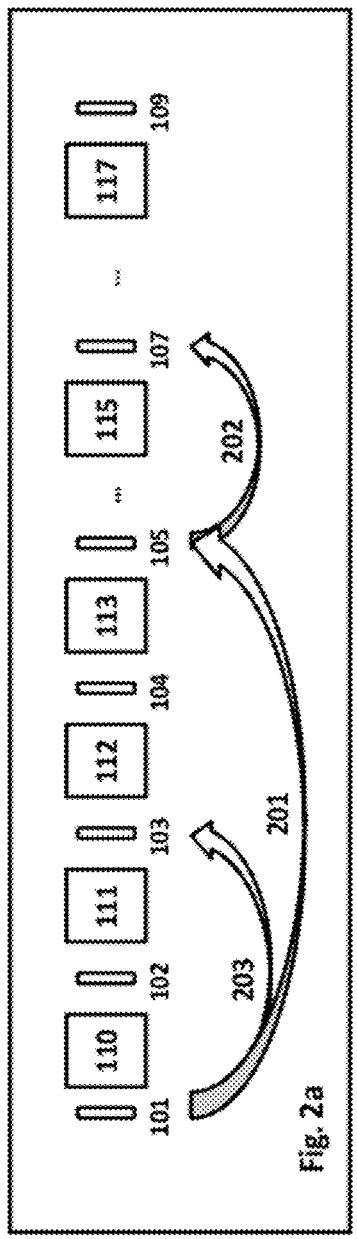
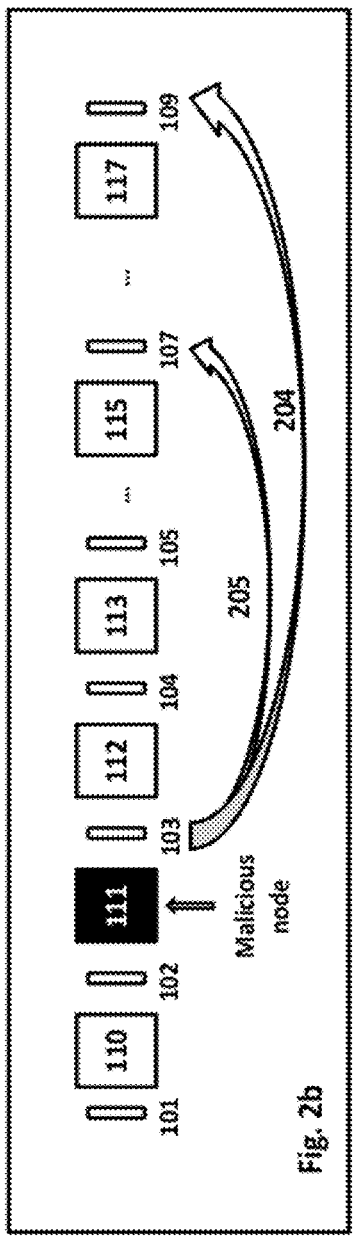
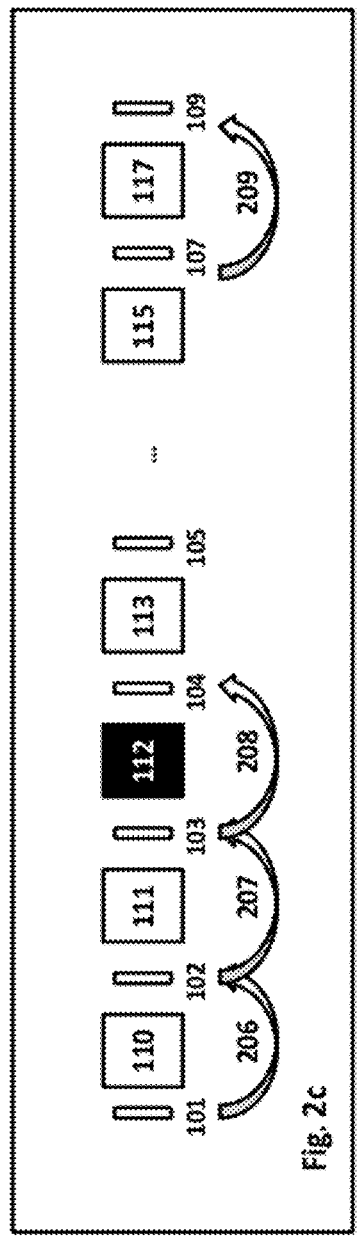

METHOD FOR VERIFICATION OF DECRYPTION PROCESSES

FIELD OF THE INVENTION

The present invention is suitable for applications where the verification of decrypted messages' integrity is required. Specifically, it may be relevant in decryption processes where the anonymity of the senders of encrypted messages shall be preserved, like in Mixnets.

The invention may be used in remote electronic voting environments.

BACKGROUND OF THE INVENTION

Sensitive information is usually encrypted when it has to be sent through an insecure channel, so that only the intended receiver can decrypt it. Therefore, other people, entities or systems accessing this information are unable to understand it.

Methods already known from the state of the art are used to ensure the integrity of the encrypted message during the transmission, such as digital signatures. However, the receiver must generally trust that the decryption process recovers the plaintext message that corresponds to the received cipher text. The decryption application is usually trusted, in the sense that it does not change the result of the decryption process. However, when this operation is done by a third party, this could manipulate the information recovered after decryption. Currently, this problem has been approached in message decryption processes where the anonymity of the message source has to be preserved. Since this kind of processes does not only decrypt the information, but also performs other operations in order to anonymize it, several methods have been proposed for providing verification tools that validate the correct behavior of both the anonymization and the decryption processes.

Preserving Anonymity in Decryption Processes

There are schemes in which the decryption process must preserve the anonymity of the entities which have encrypted the information. An electronic voting system is an example of such schemes. In electronic voting systems, it is very important not to know the relationship between the content of a vote and the identity of the voter who cast it. For this purpose, some decryption processes used in these schemes break the correlation between the encrypted messages (linked to their source) and the decrypted ones (not linked). The most known technique for that is based on Mixnets.

A Mixnet is a permutation network composed by one or more servers or nodes which perform message permutation and decryption processes. The purpose of the Mixnet is to obtain decrypted information at the output which is not correlated with the encrypted information from the input. To achieve that, a first node receives input messages from different sources, which have been previously encrypted, and applies a transformation function to them, which generally is composed by a permutation and an encryption or decryption operation (depending on the type of Mixnet). In case the Mixnet is composed by more than one node, the transformed messages are sent to the next node. The same operations of permutation and encryption or decryption are repeated at each node sequentially, until the last node processes the messages. The original values of the messages (before they were encrypted) are obtained at the output of the last node. The purpose of Mixnets is to create an anonymous communication channel in order to preserve the privacy of the participants in a communication.

The origin of Mixnets goes back to the concept created by David Chaum [Ch81], which was originally proposed for anonymous communication by electronic mail. In that proposal, messages are encrypted several times by using nested encryption layers using an RSA cryptosystem with random padding. Each Mixnet node (Mix-node from now) has a public key $pk_i$ and a private key $sk_i$. Messages (m) sent through the Mixnet are prepared at the sources by encrypting them as many times as the number of nodes composing the Mixnet, using the public keys of the nodes in the other way round than the order in which they will process the messages. The result is an onion encryption composed by nested encryption layers, where each layer is decrypted when the encrypted message is processed by the specific node owning the corresponding private key:

$$M=pk_1(pk_2\ldots(pk_{n-1}(pk_n(m,r_n),r_{n-1}),r_{n-2})\ldots,r_1)$$

Therefore, each message m is encrypted several times using different public keys $pk_i$ and random paddings $r_i$. The first node uses its private key to decrypt the first encryption layer for all the input messages, permutes them and sends them to the next node. This operation is repeated at each node until the plaintexts are recovered in the last node.

Several proposals, called "chaumian Mixnets" or decryption Mixnets have they origin in the proposal described in [Ch81], like [FOO92 and JJR02]. In all them, messages are anonymized by means of a multiple layer encryption at the beginning and a decryption and permutation Mixnet. The main problem of these proposals is that the encryption operations to be done at the origin increases with the number of nodes in the Mixnet. Moreover, since padding is added each time the message is encrypted, the size of the resulting cipher text also increases with the number of nodes.

Looking for a solution to the problems described above, Park et al. [PIK94] proposed the first re-encryption and partial decryption Mixnet. In their proposal, messages sent to the Mixnet are encrypted only once using a cryptosystem with re-encryption properties. A cryptosystem with re-encryption properties is defined as a cryptosystem where, given a public key P, a private key S, and an encrypted message C obtained from the encryption of a message m with P, the re-encryption of a cipher text C is a cipher text C' that results in the same original message m when it is decrypted with the private key S:

$$C=Pk(m)$$

$$C'=Pk(C)$$

$$Sk(C')=Sk(C)=m$$

ElGamal or Paillier are cryptosystems with re-encryption properties.

In this kind of Mixnets, the first node receives the encrypted messages, permutes them, encrypts them again with the same public key P and partially decrypts them with a private key owned by the node. ElGamal or Paillier cryptosystems use random values when encrypting the message in order to get a different value each time a plaintext is encrypted (called probabilistic cryptosystems). When performing the re-encryption operation, a new random value is combined with the value already used to make the previous encryption:

$$m_j=Pk(m_i,r_i+r_j)$$

Permutation, re-encryption and partial decryption operations are performed at each Mix-node. The output of the last node are the decrypted messages.

In all the Mixnet proposals described above (chaumian or re-encryption ones) the main purpose is to anonymize the sources of the messages. However, they have a common problem: they are not robust in front of an attack over the integrity of the encrypted messages. In case one of the nodes decides to change the values of the transformed messages, the next node cannot detect it. In fact, an external observer cannot distinguish between the output of a node when it behaves properly than the output when it is malicious and substitutes the values of all or some messages.

Later proposals give more importance to a property called universal verifiability in order to be able to detect a cheating node. Mixnets with this property provide a proof of the correct behavior of the Mixnet, in such a way that any entity can verify this proof (the verifier entity does not need to know any secret or sensitive information, like private keys, to verify the proof). With this proof, the verifier can check that the messages at the output of a Mix-node are the same (but transformed) than the ones received at the input. Sako and Killian [SK95] proposed the first universally verifiable Mixnet based in the re-encryption and partial decryption Mixnet proposed in [PIK94]. In their proposal, each node publishes the result of partially decrypting each input, before re-encrypting and permuting the inputs. Then, all nodes provide a proof of the re-encryption and permutation operations.

The permutation proof is based in the following cryptographic proofs, also known as a zero knowledge proofs because the verifier gets to know anything about the sensitive information needed to generate them when checking their validity:

Assume that $\pi_i$ and $r_i$ are the permutation and random values (for re-encryption) used by a node i. The node generates another set of permutation $\lambda_i$ and random $t_i$ values, and performs an alternative re-encryption and permutation process using this second set, generating a second output. The verifier challenges the node (the prover) to reveal either ($\lambda_i$, $t_i$), which proves that the second transformation was done properly, or the difference between the first and second transformation ($\lambda_i \pi_i^{-1}$, ($r_i - t_i$)), which allows to the verifier to check that the output of the original transformation can be obtained by permuting and re-encrypting the outputs of the second transformation. The correct behavior of the Mixnet is then verified with a 50% of probability of being right. The number of alternative transformations and verifications can be increased in order to achieve a higher probability.

In 1998, Abe [Ab98] proposed an extension of the scheme described in [SK95] in order to reduce the amount of work required from the verifier, and to have a number of verifications independent of the number Mix-nodes. In the proposed re-encryption Mixnet, provers (nodes) have to make additional operations in order to provide a joint proof of their actions. The main contribution is the chaining of proofs of different nodes, so that the verifier only has to verify the proof of the last node. Nodes perform a secondary transformation to prove the correctness of the re-encryption and permutation operations, like in [SK95]. The main difference is that the second transformation is based in the second transformation of the previous node, instead of the input messages of the actual node. In case the verifier challenges the second transformation, then all the nodes reveal the values of their second transformations simultaneously. Otherwise, if the verifier challenges the difference between the first and second transformation, the nodes sequentially compute the difference and reveal it in turn. Anyway, the verifier just has to verify one transformation (the secondary, or the difference between the primary and the secondary). The cost of verifying the decryption process is also independent of the number of nodes, since the nodes cooperate to generate the decryption factor, and provide a chained zero knowledge proof to prove that this decryption factor was generated properly.

In 2002, Jakobsson et al. [JJR02] presented a verification technique called RPC (Randomized Partial Checking). This technique can be applied to all Mixnets, independently of the encryption and permutation methods they use. In RPC, each node has to reveal the relationship between an input and an output for half of the processed messages (i.e., the permutation and a proof of encryption/decryption for each revealed link), which are selected in a random way. Therefore, a node could manipulate n messages with a probability of going undetected of $2^{-n}$. Regarding source anonymity, the privacy of the input-output relationships among the nodes of the Mixnet is protected with a certain probability of disclosure that is decreased with the number of nodes, which can be enhanced by carefully selecting the input-output relationships to be disclosed at each node: when selecting the relations to audit at random, a complete disclosure of input-output relationship through the Mixnet (in all the Mix-nodes) could be revealed (which means that, for that message, we could know its source), violating the privacy of the message source. This can be solved by grouping the nodes by pairs: node 1 with node 2, node 3 with node 4, and so on. With this node grouping, half of the messages in the first node of each pair is selected at random, and the half of messages to be selected in the second node depends on the non-selected in the first one. The selected messages are verified at each node by pairs. This way, the whole trajectory of a message in the Mixnet is never disclosed, protecting source anonymity. However, this anonymity depends on half of the nodes being honest.

Although the trajectory of a message through the Mixnet is protected from disclosure with this last method, revealing half of the links at each Mixing node provides some extra information to the verifier, who gets to know that the probability of an input message to be in a specific output of the Mixnet may be higher than in the other proposals (the probability from the point of view of the verifier is not equally distributed among all the outputs).

In 2004 Chaum [Ch04] solved this issue by grouping the nodes in groups of 4. At each group, the information of half of randomly selected messages of the first node is revealed, and the information of other half is revealed in the second node. Finally, half of the messages revealed in the second node and another half of the revealed in the third node, are revealed in the third node and the remaining set is revealed in the four. This way, the probability, from the point of view of the verifier, of an input message to be in an specific output is equally distributed among all the outputs.

The probability of detection of a cheating node is still very low for small quantities of manipulated messages. For example, the chances of detecting the manipulation of two messages are about 75%, so there is a 25% of probability that this manipulation goes undetected. This percentage is independent of the total number of messages in the Mixnet.

In the invention EP1633077A2, also described in [Ne01], another universally verifiable Mixnet is proposed. In this invention, the verification of the correctness of the Mixnet operations, which uses the ElGamal cryptosystem, is done by interactive zero knowledge proofs. In this scheme, the verification system is based on the property of polynomial invariance independently of the permutation of their roots. This verification system is better than the RPC proposal in the sense that it fully protects the anonymity of the message source (it is not based on revealing pieces of paths of the messages through the nodes, but on proving mathematical relationships between input and output messages at each node). Moreover, the probability of detection of a manipulated message is higher, being this scheme the most robust of the schemes presented by now. The main drawback of this system is that the computation and verification of the mathematical proofs has a very high computational cost.

After this proposal, Golle et al. [Go02] proposed a new universally verifiable Mixnet called "Optimistic Mixing", with proofs that are significantly faster than other proposals of verifiable Mixnets, in case all the nodes behave honestly. For each node, the input messages are multiplied together, and so are the output messages. A zero knowledge proof showing that both results contain the same encrypted value is used to detect any misbehavior in the Mixnet. For proving that, the proposal takes profit of the homomorphic properties of certain cryptosystems. In case the proof is not correct, a more robust and slow Mixing verification scheme is used to detect the cheating node/s, for example [Ne01].

This scheme also improves the RPC systems from the point of view of the anonymity of the source, since the disclosure of any permutation or information about the encrypted messages is not needed for the verification process. The probability of detection of manipulated messages can be better or worse than in RPC systems, depending on the specific situation. Since the verification is based on the product of inputs and outputs of each node, a malicious node could manipulate two messages in such a way that the manipulation is canceled when multiplying (for example, by multiplying a message by a value and dividing another message by the same). Therefore, certain message manipulations may not be detected by this scheme.

Some of the verifiable Mixnet schemes previously described achieve a robust verification process by using a high number of cryptographic proofs, which is very costly from the point of view of computation resources. Therefore, it is very difficult to implement these schemes for practical applications where time may be a constraint. Others, like those based on RPC, have a probability of detection very low in case of Mixnets processing a short amount of messages, and they may not maintain a 100% anonymity level of the message sources. On the other side, the most efficient scheme ([Go02]) needs to use slower systems in case of detecting any error.

The present invention is based on the implementation of a source-anonymizing verifiable decryption system solving the efficiency problems of verifiable Mixnets that use zero knowledge proofs to prove their correct behavior, maintaining a high probability of detection of possible manipulations, and that does not depend on the number of nodes to guarantee the anonymity of the message sources.

BRIEF DESCRIPTION OF THE INVENTION

The present invention describes a verification method which allows to ensure that the decryption process has been done honestly by the entity in charge of that (i.e., decrypted data corresponds with encrypted data).

This verification method can be applied in decryption processes where the anonymity of the entities that have submitted the messages to be decrypted has to be preserved, like in Mixnets.

The method to be described is characterized by basing the verification of the correctness of the decryption process in a proof demonstrating that the result of the operation (represented here and after with the operator $\phi$) of subsets of encrypted messages is equal to the encryption of the result of operating (represented here and after with the operator $\Theta$) the decrypted messages.

In a basic embodiment, the method is composed by the following steps:
a. Individual encryption of each message from one or more sources, by means of a public key from an asymmetric cryptographic algorithm with homomorphic properties, such that the operation $\phi$ of encrypted messages results in the encryption of the operation $\Theta$ of the messages;
b. Generation of a first input integrity proof of the encrypted messages based on the operation $\phi$ of blocks (subsets) of the input encrypted messages;
c. Decryption of the encrypted messages using a private key related to the encryption public key;
d. Generation of an output integrity proof based on the operation of blocks of decrypted messages with operation $\Theta$;
e. Generation of a second input integrity proof relating the first input integrity proof corresponding to the blocks of messages encrypted in step a) with the output integrity proof corresponding to the blocks of messages decrypted in step c); and verification of the correct decryption of the whole set of messages by comparing the output integrity proof calculated from the blocks of decrypted messages, generated in step d), and the first input integrity proof calculated from the blocks of messages encrypted in step a), linked by means of the second input integrity proof.

In a preferred embodiment, the method uses cryptographic algorithms with additive or multiplicative homomorphic properties, such as ElGamal, ElGamal with message exponentiation, Paillier, or Elliptic Curve systems. In a specific embodiment where ElGamal with message exponentiation or Paillier is used, the operation $\phi$ is the product of the components of the cipher text after encryption, and the operation $\Theta$ is the addition of plaintexts. In case of systems based on Elliptic Curves, the operation $\phi$ is the addition of points of the elliptic curve, and the operation $\Theta$ is the addition of plaintexts.

In another specific embodiment with ElGamal, the operation $\phi$ is the product of the components of the cipher text after encryption, and the operation $\Theta$ is also the product of the plaintexts. The use of specific codes to represent the content of the messages, so that they can be individually extracted from the result of the operation $\Theta$ of the messages (i.e., by means of a factorization process), is considered.

The method also considers an alternative embodiment where an integrity proof of the message is generated and concatenated to it. The integrity proof can then be encrypted jointly with the message, or both can be encrypted individually and concatenated after that. The integrity proof may be obtained using a cryptographic hash function (i.e., SHA1), a compression function (i.e., ZIP), or another type of function.

In an alternative embodiment, the decryption process preserves the anonymity of the message source using a decryption, re-encryption, or re-encryption with partial decryption Mixnet. In this embodiment, the method extends the verification of the decryption process by generating intermediate integrity proofs from the blocks of messages transformed by each Mix-node, which are the input of the following Mix-node. These intermediate integrity proofs are generated over the blocks of messages to be transformed in the node receiving these messages, over the blocks of messages in the node sending these messages, or in both.

This verification extension implements the same verification processes done over the input and output integrity proofs, but using the intermediate integrity proofs instead of the input ones. This verification extension may also include the possibility of making verifications between the intermediate integrity proofs received and generated by the nodes. These verifications between intermediate integrity proofs can be used for online verifications (i.e., in order to verify the correct behavior of one or more nodes while the mixing has not finished yet) or offline (i.e., a posteriori, in order to detect which Mix-node has misbehaved in case the verification of the input and output integrity proofs in that node fails).

Verification of integrity proofs may also be done in a distributed way.

A practical application of this method is its use in electronic voting environments, in order to verify the proper decryption of the votes while preserving the anonymity of voters.

BRIEF DESCRIPTION OF THE DRAWINGS

FIG. 1a shows the main implementation elements of the verification method for decryption processes:
118: original messages.
119: encrypted messages.
120: decryption system.
121: decrypted messages.
122: first input integrity proof.
123: output integrity proof.
124: second input integrity proof.

FIGS. 2a, 2b, and 2c show how the comparison of the intermediate proofs can be implemented in order to identify malicious nodes in a preferred embodiment where the decryption process preserves the anonymity of the message sources by means of a Mixnet. This way, a malicious node can be detected in case of detected an wrong behavior.

In this figures 110 to 117 are mixnet nodes and 101 to 109 are integrity proofs of the adjacent depictured node.

FIG. 2a shows the first phase of the binary search algorithm, used to identify the first malicious node in the Mixnet. The operations described in this FIG. 2a are:
In a first step 201 the first integrity proof 101 is compared with the intermediate integrity proof of the node n/2 105.
In case no manipulation is detected in the previous step, the next comparison 202 is done between the node n/2 105 and the node with identifier (n+n/2)/2 107.
In case any difference is detected between nodes 110 and n/2 105, the next comparison 203 is done between the node 110 and the node n/4 103.
Steps 202 and 203 are repeated until the number of compared integrity proofs is enough to detect the malicious node.

In FIG. 2b the second phase of the binary search algorithm, where other malicious nodes in the Mixnet (apart from the one found initially) are identified, is described. The operations described in this figure are:
Once the malicious node 111 has been identified, its integrity proof 103 is compared 204 with the one from the last node 117, 109, in order to check if there are more malicious nodes.
In case the proofs are different, steps described in FIG. 2a are repeated taking this integrity proof 103 as reference, so that other malicious nodes can be detected.

In FIG. 2c the exhaustive comparison algorithm is described. In this algorithm, the behavior of each node is compared one by one. The following processes are involved:
The input integrity proof 101 is compared 206 with the integrity proof from node 110 (102).
In 207, the integrity proof from node 110 (102) is compared with the integrity proof from node 111 (103), and so on.
Malicious nodes are identified as those which their integrity proof does not match the integrity proof from the previous node (112).

Figure 1B:
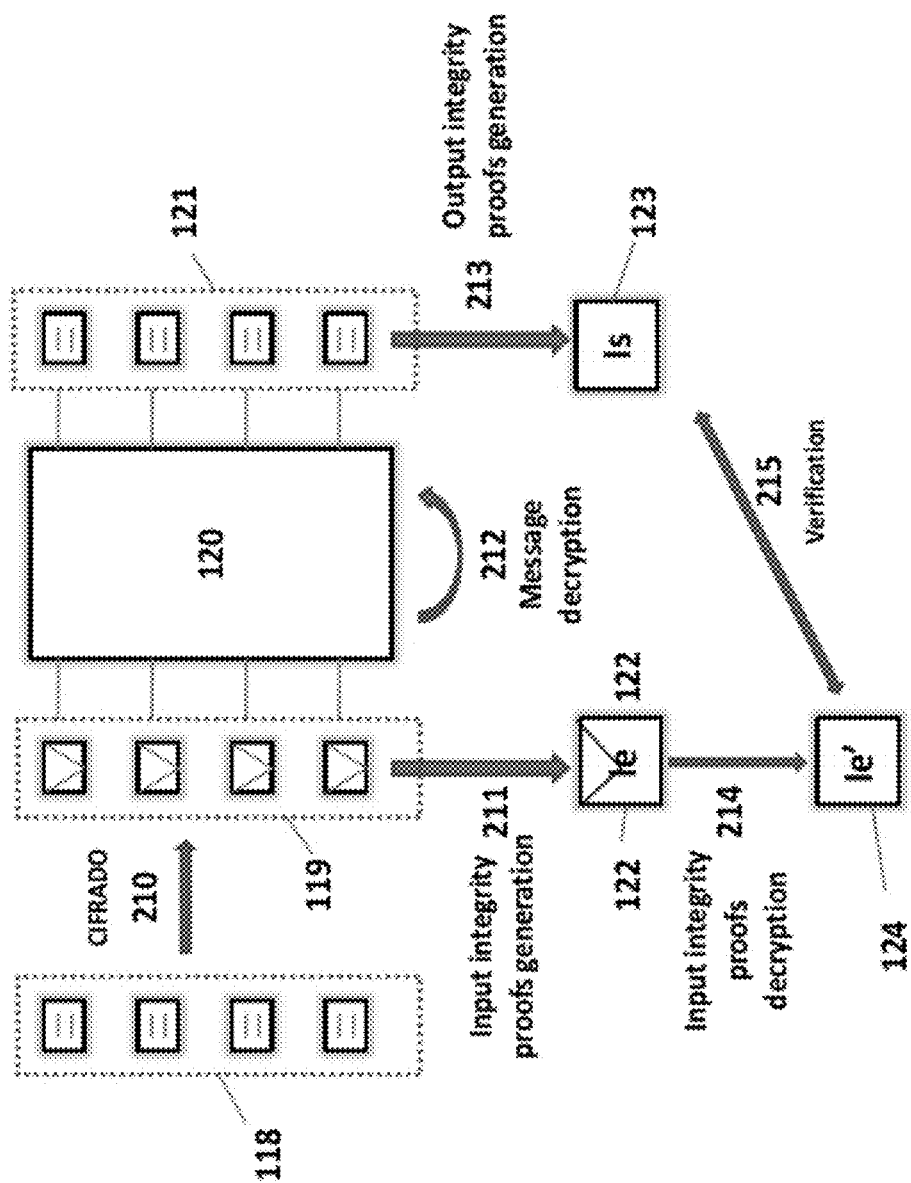
FIG. 1b shows the main process of the presented invention. The figure shows the details of the process where the original messages 118 are transformed into the decrypted messages 121, in a verifiable process of encryption and decryption. The steps are the following:
Original messages 118 are encrypted 210 in such a way that the decryption system 120 receives encrypted messages 119 at its input.
Once the messages are encrypted 119, the first input integrity proof 122 is calculated 211 from the operation of the input encrypted messages 119.
The encrypted messages 119 are received in the decryption system 120, where they are decrypted 212.
The output integrity proof 123 is calculated 213 from the decrypted messages 121.
The first input integrity proof 122 is decrypted 214 before, while or after the process of message decryption 212. In case the comparison 215 between the result of decrypting the first input integrity proof (that is, the second input integrity proof) 124 with the output integrity proof 123 is successful, the coincidence between the values of the decrypted messages 121 at the output of the decryption system 120 with the original messages 118 is demonstrated.
Figure 1C:
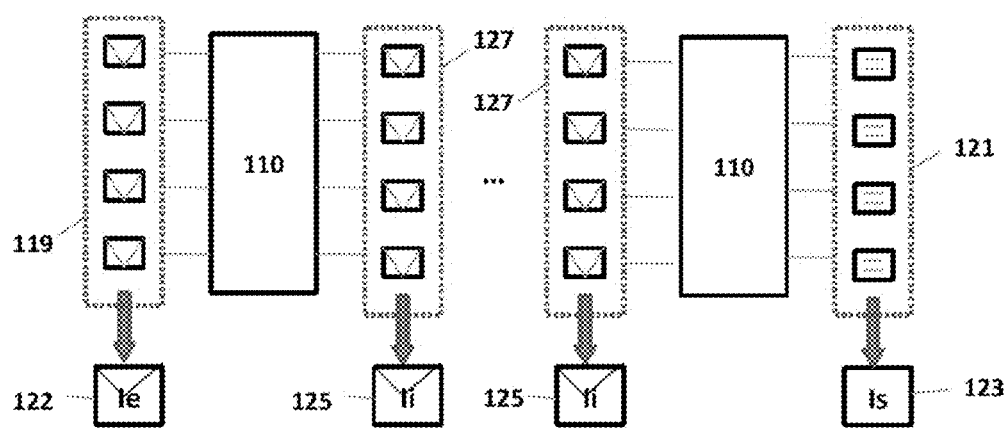
FIG. 1c shows a preferred embodiment where a Mixnet composed by various nodes is used to preserve the anonymity of the message sources. The embodiment components are:
110: Mixnet nodes.
119: encrypted messages.
121: decrypted messages.
122: first input integrity proof.
123: output integrity proof.
125: intermediate integrity proofs.
127: transformed messages Intermediate integrity proofs are generated by means of the operation of the encrypted messages at the output/input connected with the previous or the following node.
Figure 3:
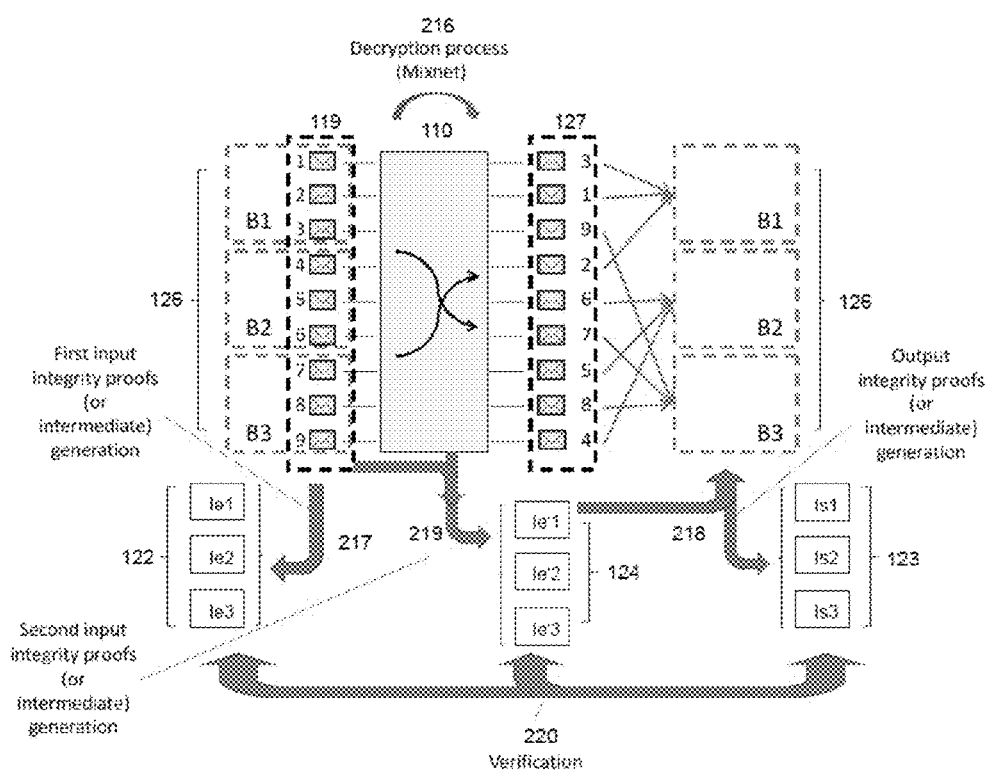
In FIG. 3, a recommended embodiment for using this method in a Mixnet is described. The embodiment components are:
110: Mixnet node.
119: encrypted messages.
122: first input integrity proof (or intermediate input).
123: output integrity proof (or intermediate output).
124: second input integrity proof (or intermediate input).
126: message blocks.
127: transformed messages.
Processes involved in the figure are:
Decryption process 216 in a Mixnet node 110 in order to obtain the transformed messages 127 from the encrypted messages 119.
Generation 217 of first input integrity proofs 122 from the blocks 126 of encrypted messages 119.
Generation 219 of second input integrity proofs 124 of the message blocks 126 from the information of the encrypted messages 119 contained in each one of these blocks 126, and the information from the transformation process 216 which was applied to each one of the encrypted votes 119 in order to obtain the transformed votes 127.
Generation 218 of the output integrity proofs 123 of each message block 126 from the localization of the set of transformed messages 127 which belong to the encrypted messages 119 from that block 126, by using the localization information contained in the second input integrity proof 124 of that block 127, and operating the transformed messages 127 of that block 126.

Verification 220 for each block 126 of the equality between the output integrity proof 123 from the block 126 and the first input integrity proof 122 from the same block, one this first input integrity proof 122 is transformed by the Mixnet node 110, by using the transformation information applied by the decryption process 216 to each encrypted message 119 from this block 126, which is contained in the second input integrity proof 124 of this block 126.

DETAILED DESCRIPTION OF THE INVENTION

The present invention describes a verification method which can be used to assess that a decryption process has been done in a proper way by the entity in charge of it (i.e., decrypted data corresponds with encrypted data). This verification method is suitable for decryption processes where the anonymity of the sources which generated the encrypted data must be preserved, such as in a Mixnet.

The decryption verification method described in the present invention allows the validation of the integrity of messages operated by the decryption process by means of generating and verifying an integrity proof of the encrypted messages before and after being transformed by the decryption process. This method is directly applied over the messages at the input and output of the decryption process. Therefore, the method is independent of the decryption process implementation: the method can be used in decryption processes where the messages are directly decrypted, or in decryption processes where the anonymity of messages' sources shall be preserved (e.g., a Mixnet).

In case of Mixnets, this method can be used to verify the correctness of the permutation and transformation of encrypted messages at each node in the Mixnet, by generating one or more integrity proofs which are used to verify that the content of the input messages has not been modified during the permutation and transformation operations.

The verification method described in the present invention is composed by the following steps:
a) Encryption
b) Generation of first input integrity proofs
c) Decryption
d) Generation of output integrity proofs
e) Generation of second input integrity proofs
f) Verification Encryption Phase:

In this phase, messages are encrypted in order to preserve their secrecy. Public key cryptosystems with homomorphic properties are used for this purpose. Nowadays, there are some cryptosystems in the state of the art which have that property, such that ElGamal, Paillier, or those based on elliptic curves. Messages are encrypted by using the public key P of the defined cryptosystem.

Messages in this phase are formatted in such a way that once they are encrypted can be operated together, obtaining as a result the encryption of the operation of plaintext messages. For instance, Let's assume c1 and c2 the result of encrypting the messages m1 and m2 respectively with the public key P of a public key cryptosystem with homomorphic properties. The messages are encrypted in such a way that:

$$c1=P(m1)$$

$$c2=P(m2)$$

$$c1\phi c2=P(m1\Theta m2)$$

Being $\phi$ the operation of the encrypted messages together in order to obtain the encryption of the operation $\Theta$ of the plaintext messages.

In a preferred embodiment, an integrity proof of the message, Hm, is generated in this step and is combined with it before encryption. This integrity proof may be obtained by applying a digest function to the message, like a cryptographic hash function (i.e., SHA1), or a compression function like ZIP. Assuming the integrity proof is based on a cryptographic hash function h( ), the operation can be represented as:

$$Hm=h(m)$$

The combination | of message and integrity proof Hm may be a concatenation before the encryption process:

$$c1=P(m1|Hm1)$$

Or it may be done after the individual encryption of message and integrity proof:

$$c1=P(m1)|P(Hm1)$$

In an alternative embodiment, the integrity of the encrypted message could also be protected by means of a digital signature with a secret key Se:

$$Se(c1)=Se(P(m1))$$

or $$Se(c1)=Se(P(m1|Hm1))$$

or $$Se(c1)=Se(P(m1)|P(Hm1))$$

The secret key Se could be different for each message source or common for a subset or the whole set of the encrypted messages.

In a preferred embodiment, cryptosystems with additive homomorphic properties are used, where the operation $\Theta$ is equivalent to an addition.

In another preferred embodiment, cryptosystems with multiplicative homomorphic properties where the operation $\phi$ is the product of the encrypted messages and the operation $\Theta$ of the plaintext messages is also a product, are used. In this embodiment, messages may be represented as prime numbers. Therefore, their individual values can be obtained from the result of operating (using $\Theta$) the messages, by means of a factorization process. In case of using prime numbers, message integrity can be verified by checking that the decrypted message is composed by prime factors from the specific set of prime numbers selected to represent the plaintext messages.

In an alternative embodiment the message integrity proof is generated after it is encrypted.

Generation of a First Input Integrity Proof:

The first input integrity proofs are generated over a list E of encrypted messages before they are decrypted. In case they have been digitally signed, the digital signature is not used to calculate this proof. The first input integrity proof is generated by operating (using $\phi$) the set of encrypted messages. The details of the operation depend on the homomorphic properties of the encryption algorithm. This method is characterized by generating the input integrity proof from blocks of encrypted messages.

In case of input integrity proofs are generated from multiple blocks of messages, these proofs are operated together in order to obtain the first input integrity proof of the whole encrypted messages:

$$Ie_1 = c_1 \Phi \ldots \Phi c_x$$

$$Ie_2 = c_{x+1} \Phi \ldots \Phi c_y$$

$$\ldots$$

$$Ie_n = c_{z+1} \Phi \ldots \Phi c_w$$

$$Ie = Ie_1 \Phi \ldots \Phi Ie_n$$

The operation $\phi$ used to operate the first input integrity proofs of each block to obtain a first input integrity proof of all the messages can be the same operation $\phi$ used over the messages $c_i$ to generate the first input integrity proofs per block, or it may be a different arithmetic, logic or group (p.e., concatenation or grouping) operation.

In a preferred embodiment the operation $\phi$ is an operation of element grouping or union. Therefore, the first input integrity proof is composed by the group or union of first input integrity proofs generated per block, where the blocks are the result of dividing the whole set of messages in subsets:

$$Ie = \{Ie_1, \ldots, Ie_n\} \, \delta Ie = \{Ie_1 \cup \ldots \cup Ie_n\}$$

In case messages were composed by a concatenation of a plaintext and an integrity proof, the first input integrity proof could be calculated from the ciphertext obtained from the encryption of the message plaintext and the integrity proof.

$$Ie = P(m_1|Hm_1) \phi \ldots \phi P(m_w|Hm_w)$$

In an alternative embodiment, where messages are composed by a concatenation of a plaintext and an integrity proof, the first input integrity proof can be calculated from the operation $\phi$ of only the integrity proof of the plaintext message, instead of using both the plaintext and its integrity proof.

In case the plaintext and the integrity proof were concatenated before encryption $c_i = P(m_i|Hm_i)$, only the bits belonging to the encrypted integrity proof could be selected for the operation. For example, in case the integrity proof is 160-bit long, the selection could be the lest significant 160 bits. It is very important that the encryption process does not change the position of the Hm value in the cipher text in this situation.

In case the plaintext and the integrity proof were encrypted before concatenation $c_i = P(m_i)|P(Hm_i)$, a first input integrity proof can be generated by using the cipher texts corresponding to the message integrity proofs:

$$Ie = P(Hm_1) \phi \ldots \phi P(Hm_w)$$

Or independent input integrity proofs could be generated from each cipher text:

$$Ie_H = P(Hm_1) \phi \ldots \phi P(Hm_w)$$

$$Ie_m = P(m_1) \phi \ldots \phi P(m_w)$$

This phase of generating input integrity proofs can be done before or after the decryption and output integrity proof generation phases.

In case message integrity has been ensured by means of a digital signature, input integrity proofs from blocks of encrypted messages can be generated by operating only the encrypted message (i.e., without using the digital signature).

$$c_i = (P(m_i), Se(P(m_i)))$$

$$Ie_1 = P(m_1) \phi \ldots \phi P(m_x)$$

In a preferred embodiment, blocks over which the first input integrity proofs per block are calculated are composed by encrypted messages randomly selected from the whole set of messages over which the first input integrity proof is generated. Therefore, the union of the subsets of input messages composing each block is the total set of input messages to be processed. The random selection of messages for each block can be defined by the entity verifying the process, by the entity executing the input integrity proof generation, by another entity or by a combination of them.

In a preferred embodiment, the entity verifying the input integrity proofs may randomly select the blocks of input messages over which the input integrity proofs per block are generated.

Message Decryption:

In the decryption phase information is decrypted using the private key S from the cryptosystem used in the encryption phase. Information can be directly decrypted or my means of a decryption process that preserves the anonymity of the information sources which have encrypted the messages in the first phase, such as a Mixnet. Messages can be decrypted with private key S in a single step or in several steps in case a distributed decryption process is used. For example, a distributed decryption process may be composed by several steps where messages are partially decrypted at each step by using a share of the private key S. Therefore, at some point the private key S may have been split in shares by using a secret sharing scheme from the state of the art, like Shamir. In this case, the final information decryption is obtained by combining partial decryptions.

Anyway, the result of the decryption process is a list of the original messages encrypted by the sources.

$$O = \{m_1, \ldots, m_w\}$$

In case an anonymity-preserving decryption process has been used, the order of the decrypted messages will not be the same order of the original messages that were encrypted in the first phase, so that decrypted messages cannot be linked to the cipher texts generated in the first phase (i.e., a decrypted message cannot be unequivocally linked to its source).

In case messages were concatenated with an integrity proof of themselves, an additional step could verify this integrity proof using the decrypted message. In order to do that, the same digest or compression function used to generate the integrity proof in the first phase is used in this phase to generate a new integrity proof from the decrypted message (Hm'), which will be compared with the integrity proof that was generated in the first phase:

$$S(P(m|Hm) = m|Hm$$

$$Hm' = h(m) = Hm$$

Or in case the encrypted message was composed by (P(m)|P(Hm)):

$$S(P(m)) = m$$

$$S(P(Hm)) = Hm$$

$$Hm' = h(m) = Hm$$

In case the comparison fails, we can establish that the decryption process has not worked properly.

In case a source anonymity preserving decryption process is used, such as a Mixnet, the method considers the generation of input integrity proofs at each node composing the Mixnet. These proofs, which will be identified as first intermediate input integrity proofs, are generated in the same way that the first input integrity proofs described in the second phase, using the set of input messages at each node. Depending on the location of the node in the Mixnet, input messages at this node will be the same than the output messages from the previous node.

Message blocks over which the first intermediate input integrity proofs are generated at each node may be composed following this rules:
- At the first node, encrypted messages belonging to each message block (over which the first input integrity proofs are generated) are randomly selected from the whole set of input messages. The process may be similar to that described in the second phase to select the messages composing each block.
- The same number of message blocks are configured in second and posterior nodes. Encrypted messages composing each block are selected by taking as reference the messages composing each block in the previous node, which are used to generate the first input integrity proofs or the first intermediate input integrity proofs at that node. In a preferred embodiment, blocks of encrypted messages used to generate the first intermediate input integrity proofs in second and posterior nodes will contain at least an encrypted message from each block defined in the previous node after being transformed by the decryption process in that node (p.e., after re-encryption, decryption or re-encryption and partial decryption).

In case several first intermediate input integrity proofs are generated, each one from the input messages belonging to one block (that is, first intermediate input integrity proofs per block), they are generated as:

$$Ie_1 = c_{x1} \Phi \ldots \Phi c_{xy}$$
$$Ie_2 = c_{x2} \Phi \ldots \Phi c_{xv}$$
$$\ldots$$
$$Ie_n = c_{xn} \Phi \ldots \Phi c_{xw}$$

Where the cipher texts composing the blocks $\{c_{x1} \ldots c_{xy}\}$, $\{c_{x2} \ldots c_{xv}\} \ldots \{C_{xn} \ldots c_{xw}\}$ may be randomly selected by the verifier entity from the whole set of input messages.

In a preferred embodiment the method considers the decryption of the message operation $\Theta$ as result of the operation $\phi$ of the encrypted messages, and the posterior extraction of the individual message values by means of a factorization process, where operations $\Theta$ and $\phi$ are generally multiplications.

Generation of the Output Integrity Proof:

Once messages have been decrypted, an output integrity proof Is is generated from the operation $\Theta$ of the messages decrypted with the private key S:

$$Is = m_1 \Theta \ldots \Theta m_w$$

In case the message plaintexts had been concatenated with an integrity proof of themselves, the output integrity proof could be generated over the concatenation of messages and integrity proofs:

$$Is = (m_1|Hm_1) \Theta \ldots \Theta (m_w|Hm_w)$$

In case the message plaintexts had been concatenated with an integrity proof of themselves, this output integrity proof could also be generated by operating the values of the message integrity proofs instead of using both the integrity proof and the message text:

In case: $c_i = P(m_i|Hm_i)$ or $c_i = P(m_i)|P(Hm_i)$

We calculate:

$$Hm_1 = h(m_1)$$
$$\ldots$$
$$Hm_w = h(m_w)$$
$$Is = Hm_1 \Theta \ldots \Theta Hm_w$$

That output integrity proof could be used on its own, or another output integrity proof could be generated over the message plaintexts (without their integrity proofs):

$$Is_m = m_1 \Theta \ldots \Theta m_w$$

$$Is_H = Hm_1 \Theta \ldots \Theta Hm_w$$

In case a source anonymity preserving decryption process is used, such as a Mixnet, the method considers the generation of output integrity proofs at each node of the decryption process (p.e., at each node of the Mixnet). These proofs, called intermediate output integrity proofs, are generated as well as the first intermediate input integrity proofs, but using blocks composed by messages already transformed by the decryption process at that node instead (output messages). In case of the last node, where the decrypted messages are obtained at the output, the output integrity proof is generated over the decrypted messages in the same way that it has been described at the beginning of this section.

In a preferred embodiment, blocks of transformed messages are generated by selecting the same messages belonging to the same blocks defined at the input of the node. Therefore, it is preferred to define the same number of blocks at the output than at the input: they will contain the same messages, the difference is that messages in the output have already been transformed and do not follow the same order than in the output (due to the permutation operation done by the node). In case of using a Mixnet, each block of transformed messages contains the same messages than same block in the input, but after being re-encrypted, decrypted, or re-encrypted and partially decrypted.

Generation of the Second Input Integrity Proof:

The first input integrity proof/s are decrypted in this phase using the same private S used to decrypt the messages, obtaining the second input integrity proof/s:

$$Ie' = S(Ie)$$

This phase can be executed during the message decryption phase (in parallel or being part of the same process) or at any time after the first input integrity proof/s have been generated.

In case of using encryption algorithms with probabilistic properties, the encryption randomness could be published, so that a verifier can check that the decryption of Ie to obtain Is has been correct by encrypting Is using that randomness and comparing that the result Ie' is equal to Ie.

There are in the state of the art some algorithms with this property. For example, the following components are defined in the ElGamal cryptosystem:

| | |
|---|---|
| g, generator of $Z_p^*$ | p is a large prime |
| private key: x | x is a random number in $Z_p$ |
| public key: (h, g) | where $h = g^x \bmod p$ |
| message: m | |

A message is encrypted as:

$$c=(m\cdot h^r, g^r) \text{ where r is a random number in } Z_p$$

The decryption process calculates $h^r=(g^r)^x$ to obtain $m=c/h^r$. Therefore, in case $h^r$ is published, Ie can be calculated from Is:

$$c=(Ie, g^r)$$

$$Ie'\cdot h^r = Ie$$

The same procedure can be followed when using ElGamal based on Elliptic Curves:

| | |
|---|---|
| G | curve generator point |
| n | elliptic curve order |
| private key: x | x random number $0 < x < n$ |
| public key: Q | where $Q = xG$ |
| message: m | | message translated as a point: M, point of the elliptic curve representing the message.

A message is encrypted as: $c=(r\cdot G, M+r\cdot Q)$, where r is a random number and + designates the addition operation of points following the arithmetic rules defined for a group of points of an elliptic curve.

A messages decrypted as $r\cdot Q = r\cdot G\cdot x$, so, in case $r\cdot G\cdot Q$ is published, Ie can be calculated from Is:

$$c=(r\cdot G, Ie)$$

$$Ie' + r\cdot Q = Ie$$

In a preferred embodiment the randomness is not published, but the decryption process generates a decryption proof demonstrating that it knows this value without showing it, in such a way that the verifier is convinced of that, for example using the Schnorr Identification Protocol:

In case of using an ElGamal cryptosystem with the components defined above, the Schnorr Identification Protocol allows a prover to demonstrate that he/she knows the private key x so that $g^x = h$.

The prover is the process decrypting the messages, which performs the following steps:

Divide the input integrity proof by the output integrity proof: $Ie/Is = (h^{ri+\cdots+rv}, g^{ri+\cdots+rv}) = (h', g')$.

Calculate a non-interactive challenge using all the cipher texts to be decrypted: $z=H(c_{11}\phi \ldots \phi c_{xy})$, where H is a cryptographic hash function.

Take $h'' = h^{iz}\cdot h$ and $g'' = g^{iz}\cdot g$.

Generate $f = "^e$, where e is a random number in Zp.

Calculate $d=H(f|h''|g''|g)$, where H is a cryptographic hash function.

Calculate $s = x\cdot d + e$, where x is the private key used to decrypt the cipher texts.

The zero knowledge proof for the couple of input/output integrity proofs is [f,s].

In the verification process:

The verifier divides the input integrity proof by the output integrity proof: $Ie/Is = (h^{ri+\cdots+rv}, g^{ri+\cdots+rv}) = (h', g')$.

Calculate a non-interactive challenge using all the cipher texts to be decrypted: $z=H(c_{11}\phi \ldots \phi c_{xy})$, where H is a cryptographic hash function.

Take $h'' = h^{iz}\cdot h$ and $g'' = g^{rx}\cdot g$.

Calculate $d=H(f|h''|g''|g)$, where H is a cryptographic hash function.

Check that $g''^s = h''^d\cdot f$.

In case the comparison fails, the decryption process has not recovered the same messages that were originally encrypted at the source.

In case of using a source anonymity preserving decryption process, such as a Mixnet, the method considers the generation of second input integrity proofs at each decryption node (or node composing the Mixnet). These proofs, called second intermediate input integrity proofs, contain information about the transformation process performed at each decryption node for the set of messages composing each block at the input of the node, which have been used to generate the first input integrity proofs or first intermediate integrity proofs at that node. This transformation could be permutation and re-encryption, decryption, or re-encryption with partial decryption operations in case a Mixnet is used.

In a preferred embodiment, this second input integrity proof or this second intermediate input integrity proof is used to generate the output integrity proofs.

In a preferred embodiment, these second input integrity proofs or second intermediate input integrity proofs are used to generate the output integrity proofs. To this end, the information of the transformation done over the encrypted input messages (p.e., the permutation applied over the messages) is used to link each input message with its transformed value after the decryption process. Therefore, blocks of transformed messages which correspond with the same blocks containing the same messages in the input can be generated. The output integrity proofs would then be generated from the blocks of transformed messages.

For example, consider the operation of a node in a re-encryption Mixnet.

Assuming that:

$E=(c_1, c_2, c_3, c_4)$ is a set of 4 encrypted messages.

$B_1=(c_2)$ y $B_2=(c_3, c_4)$ are two blocks of encrypted messages defined at the node input.

$R(c_i, r_i)$ is the re-encryption of the message $c_i$ with the random value $r_i$.

$TT=(2, 3, 4, 1)$ is a permutation.

$Mix=(TT, R(c_i, P))$ is the transformation done by the Mix-node.

The operation Mix is performed over E:

$$S=Mix(E)=(R(c_4, r_4), R(c_1, r_1), R(c_2, r_2), R(c_3, r_3))$$

A second input integrity proof can be generated for each group $B_1$ and $B_2$, containing the transformed messages (p.e., new positions of messages after permutation and re-encryption—combining random values—):

$$Ie'_{B1}=((2,3), r_1+r_2))$$

$$Ie'_{B2}=((1,4), r_3+r_4))$$

Therefore, output integrity proofs or output intermediate integrity proofs can be generated after detecting the transformed messages from a specific block from the information of the permutation positions contained at each second input integrity proof:

$$Is_{B1}=R((c_1, r_1)\Theta R(c_2, r_2)$$

$$Is_{B2}=R(c_4, r_4)\Theta R(c_3, r_3)$$

In a preferred embodiment, the second input integrity proof or second intermediate input integrity proof does not provide information that can individually link the encrypted messages at the input and the transformed messages at the node output. Therefore, the method considers that the information contained in the second input integrity proof regarding the location of messages after the transformation (p.e., permutation) may not be given in such an order that makes it possible to do this links. For example, positions can be ordered by their value (like in the example above) or they can be given in a random way (always for messages from the same block).

Verification:

Finally, in the verification phase the value Ie' is compared to the Is. In case they are equal, the process has behaved properly. Otherwise, the decryption process has not recovered the same plaintext messages that were originally encrypted at the source. Since the cryptosystem used to encrypt the messages has homomorphic properties:

$$Ie' = S(Ie)$$
$$= S(c_1 \Phi \ldots \Phi c_w)$$
$$= S(P(m_1)\Phi \ldots \Phi P(m_w))$$
$$= S(P(m_1 \Theta \ldots \Theta m_w))$$
$$= m_1 \Theta \ldots \Theta m_w$$

Then, Ie' should be equal to Is.

In case the messages had been concatenated with an integrity proof of themselves, this verification could only use the input/output integrity proofs based on the encryption of the message integrity proof:

$$Is_H = Hm_1 \Theta \ldots \Theta Hm_w$$

$$Ie_H' = S(Ie_H) = S(P(Hm_1)\phi \quad . \quad . \quad . \quad \phi P(Hm_w)) = S(P(Hm_1 \Theta \ldots \Theta Hm_w)) = Hm_1 \Theta \ldots \Theta Hm_w$$

As it has been previously proposed, $P(Hm_1)$ could be the independent encryption of $Hm_1$ or the bits of the cipher text corresponding to $Hm_1$, depending on the moment the message has been concatenated with its integrity proof (before or after decryption).

In an alternative embodiment, the second input integrity proof or the second intermediate integrity proof contains information about the transformation done by the decryption process over the whole set of messages. Therefore, the verification process is done by comparing that the value of the output integrity proofs per block are the result of applying the transformation done by the decryption process over the block containing exactly the same messages before being transformed.

In order to do that, output integrity proofs per block are calculated by using the transformation information contained in the second input integrity proof per block (as it was explained in the phase of second input integrity proof generation). In case of a Mixnet, this information would be the order of the messages after the permutation.

Once the first input integrity proof and output integrity proof couples per block are generated, it can be verified that the output integrity proof of a specific block is the result of applying the transformation done by the decryption process to the first input integrity proof for the same block.

In a preferred embodiment where a re-encryption, decryption or re-encryption with partial decryption Mixnet is used, the verification involves re-encryption, decryption or re-encryption and partial decryption proofs from the state of the art.

For example, in case of using the ElGamal cryptosystem, an input integrity proof may be the operation $\phi$ of a block of encrypted messages. Being $\phi$ a product, the result may be:

$$Ie = (\{m_i^* \ldots *m_v\} \cdot h^{r_i + \ldots + r_v}, g^{r_i + \ldots + r_v}, g^{r_i + \ldots + r_v}),$$
where $i=1 \ldots v$ is the number of messages in an input block.

The output integrity proof resulting from the operation $\Theta$ of a block of decrypted messages is:

$$Is = \{m_i^* \ldots *m_v\}, \text{where } i=1 \ldots v \text{ is the number of messages in an output block.}$$

When decrypting a message $h^{ri}$ 32 $(g^{ri})^x$ is calculated, so in case the value $h^{r_i + \ldots + r_v}$ is published, it can be verified that Is has been obtained from the same block of messages than Ie by operating Is with $h^{r_i + \ldots + r_v}$ and comparing if the result is equal to Ie:

$$Is * h^{r_i + \ldots + r_v} = Ie.$$

In case the ElGamal with elliptic curves cryptosystem is used, messages are decrypted as:

$$M = (M + rQ) - rGx$$

The input integrity proof may have been generated as the operation $\phi$ of the block of encrypted messages. In case $\phi$ is a product the result is:

$$Ie = ((r_i + \ldots + r_v)G, \{M_i^* \ldots *M_v\} + (r_i + \ldots + r_v)Q,$$
where $i=1 \ldots v$ is the number of messages in an input block.

The output integrity proof is the operation of the same block of messages:

$$Is = \{M_i^* \ldots *M_v\}, \text{where } i=1 \ldots v \text{ is the number of messages of an output block.}$$

When decrypting a message $xrG = rQ$ is calculated, so in case the value $(r_i + \ldots + r_v)Q$ is published, it can be verified that Is has been obtained from the same block of messages than Ie by operating Is with $(r_i + \ldots + r_v)Q$ and comparing if the result is equal to Ie:

$$Is + (r_i + \ldots + r_v)Q = Ie.$$

In a preferred embodiment, the process generates a zero knowledge proof in order to demonstrate that it knows the randomness used in the encryption (the set $r_i + \ldots + r_v$) without publishing it, so that a verifier can validate the equations described above without knowing the values. The proof can be based on the Schnorr Identification Protocol.

In a preferred embodiment, the source anonymity preserving decryption process is based in a re-encryption Mixnet. Therefore, the method generates as many input integrity proofs as nodes in the Mixnet:

$$Ie = \{Ie_1, \ldots, Ie_n\}, \text{where } n = \text{number of nodes in the Mixnet.}$$

In a preferred embodiment, the method generates as many input integrity proofs as nodes in the Mixnet and blocks of messages have been defined.

Each first input integrity proof is generated from the set of encrypted messages at the input of each node in the Mixnet. The first input integrity proof may be generated by the previous node (in case there is a previous node) from the set of encrypted messages at its output (in this case, the proof is called first intermediate input integrity proof, as it has been previously described), and/or by the node receiving the input encrypted messages. The previous node may digitally sign the first input integrity proof or first input intermediate integrity proof as a proof of integrity, and pass it to the following node.

When a malicious behavior is detected in Mixnets composed by more than one node, certain measures can be applied in order to detect which is/are the cheating node/s. For this purpose, intermediate proofs calculated from the blocks of output messages at each node are compared with the first input integrity proof.

In a specific embodiment, the integrity proofs may be decrypted in order to make this comparison: the second input integrity proof is compared with the decrypted intermediate integrity proofs.

The following algorithm is proposed in order to make the comparison between proofs:

The first input integrity proof is compared with the intermediate integrity proof from the first node. This intermediate integrity proof is compared with the intermediate integrity proof of the following node, and so on; detecting as malicious nodes those which their integrity proof does not match the integrity proof of the previous node.

In a second proposed embodiment, which is preferred over the first one, there is no need of decrypting the integrity proofs in order to make the comparisons. Instead, the information about the transformation done by the decryption process to the messages used to calculate the first input integrity proofs, contained in the second input integrity proofs, will be used.

In re-encryption Mixnets, the verification of intermediate proofs is done by checking that the output integrity proofs at each node are the re-encryption of the input integrity proofs.

In case an ElGamal cryptosystem with the components previously defined is used, the re-encryption of a ciphertext is calculated as:

$$c' = c * (h^{r'}, g^{r'}) = (m \cdot h^{r+r'}, g^{r+r'}), \text{ where } r' \text{ is a random value}.$$

Being an input integrity the result of the operation $\phi$ of a block of encrypted messages, where $\phi$ is a product, the result is:

$$Ie = (\{m_i^* \ldots *m_v\} \cdot h^{ri+ \ldots +rv}, g^{ri+ \ldots +rv}), \text{ where}$$
$i = 1 \ldots v$ is the number of messages in a block at the input of a node.

The output integrity proof is the result of operating $\phi$ the block of re-encrypted messages:

$$Is = (\{m_i^* \ldots *m_v\} \cdot h^{ri+ \ldots +rv+ri'+ \ldots +rv'}, g^{ri+ \ldots + rv'+ \ldots +rv'})$$

When re-encrypting a message, $c' = c*(h^{r'}, g^{r'})$ is calculated, so, in case the value $h^{ri'+ \ldots +rv'}$ is published, it can be verified that Is has been obtained from the same block of encrypted messages than Ie by operating Ie to obtain Is:

$$Ie * h^{ri'+ \ldots +rv'} = Is.$$

The re-encryption values $h^{ri'+ \ldots +rv'}$ may be part of the second input integrity proof, as it has been explained before (see example in the section where the generation of this second input integrity proof is explained).

In a preferred embodiment the verification of the intermediate integrity proofs uses zero knowledge proofs like those based in the Schnorr Identification Protocol:

In case of using an ElGamal cryptosystem with the components defined previously, the Schnorr Identification Protocol allows a prover to demonstrate that he/she knows the re-encryption factor r' so that $c' = c*(h^{r'}, g^{r'})$, without showing the value, by following the next steps:

Divide each output integrity proof by the linked input integrity proof: $Is/Ie = (h^{ri'+ \ldots +rv'}, g^{ri'+ \ldots rv'}) = (h', g')$.

Calculate a non-interactive challenge using all the cipher texts to be re-encrypted: $z = H(c_{11} \phi \ldots \phi c_{xy})$, where H is a cryptographic hash function.

Take $h'' = h'^z \cdot g'$ and $g'' = h^z \cdot g$.

Generate $f = g''^e$, where e is a random number in Zp.

Calculate $d = H(f|h''|g''|g)$, where H is a cryptographic hash function.

Calculate $s = r_{eq}' \cdot d + e$, where $r_{eq}'$ is the addition of the re-encryption exponents of all the messages participating in the proof ($ri'+ \ldots +rv'$).

The zero knowledge proof for the couple of input/output integrity proofs for a block of messages in a node is [f,s].

In the verification process:

The verifier divides each output integrity proof by the linked input integrity proof: $Is/Ie = (h^{ri'+ \ldots +rv'}, g^{ri'+ \ldots rv'}) = (h', g')$.

Calculates the value $z = H(c_{11} \phi \ldots \phi c_{xy})$, where H is a cryptographic hash function.

Take $h'' = h'^z \cdot g'$ and $g'' = h^z \cdot g$.

Calculate $d = H(f|h''|g''|g)$, where H is a cryptographic hash function.

Verify that $r = h''^d f$.

In case the verification fails, the re-encryption process has not generated cipher texts with the same content than the cipher texts at the node input.

In a preferred embodiment, where several input and output integrity proofs have been generated at each node, based on the operation of messages composing each specific block, the verification process is done by comparing couples of input/output integrity proofs related to the same block of messages.

In a preferred embodiment, the verification process is done after the mixing process has finished. Such verification process provides validity to the results in case the verification is successful. Otherwise, it is used to detect the fraudulent Mix-node/s.

However, in an alternative embodiment where the verification is done from the input integrity proofs, these integrity proofs can be used during the mixing process when the Mixnet is composed by several nodes: each time a set of messages is processed by a Mix-node, an intermediate input integrity proof related to the input of the following node is generated. Using the exhaustive comparison algorithm previously described, the behavior of the actual node can be verified. In case a malicious behavior is detected the node is removed from the Mixnet, removing the set of output messages of this node and providing to the input of the following node the set of output messages from the previous node. Manipulation of messages is detected during the process in this embodiment. Therefore, malicious nodes can be removed and reliable results at the output of the Mixnet can be ensured without repeating the mixing process.

In a specific embodiment, Paillier cryptosystem for encrypting data and a re-encryption Mixnet may be used.

In another specific embodiment, ElGamal cryptosystem based on elliptic curves and a re-encryption Mixnet may be used. When a message is re-encrypted during the mixing process, a new random value $r_2$ is generated, and the re-encryption values $(r_2 \cdot G, r_2 \cdot Q)$ are calculated. After that, each component of the will be added to the cipher text to be re-encrypted:

$$m'_1 = (r_1 \cdot G, m_1 + r_1 \cdot Q) \text{ encrypted message}.$$

$$(r_2 \cdot G, r_2 \cdot Q) \text{ with } r_2 \text{ random}.$$

$$m''_1 = (r_1 \cdot G + r_2 \cdot G, m_1 + r_1 \cdot Q + r_2 \cdot Q) = ((r_1 + r_2) \cdot G, m_1 + (r_1 + r_2) \cdot Q) \text{ re-encrypted message}.$$

In a preferred embodiment elliptic curve cryptography algorithms are used, based on the definition of the elliptic curve in a projective plane composed by the points [x:y:z].

An elliptic curve defined in a projective plane $P^2(Z_n)$ is composed by the points satisfying the equation $y^2z = x^3 + axz^2 + bz^3$ in $Z_n$.

This method may be used in electronic voting environments in order to verify the correct decryption of votes while preserving the anonymity of voters.

A specific embodiment for using the described invention in an electronic voting environment is described in the following paragraphs:

Votes are encrypted by using the ElGamal cryptosystem, and votes are decrypted by means of a re-encryption Mixnet composed by several nodes, where the last one decrypts the votes.

Once the votes are permuted and re-encrypted at all the nodes (but the last one) an authorized auditor requests the generation of the first input integrity proofs, the output integrity proofs, and the second input integrity proofs at each node in order to verify the correct behavior of the Mixnet.

In this embodiment, encrypted votes at the input of a node are randomly divided in blocks, being the proofs calculated over the set of votes composing each block. The auditor selects a random combination (unknown before the permutation and re-encryption processes have finished) from which the votes composing each block are defined.

The steps are the following:

The verification process starts after all the nodes (but the last one) have permuted and re-encrypted the votes. For the first node, the auditor randomly defines the votes composing each block.

First input integrity proofs are generated by multiplying the encrypted votes at the input of the node composing each block.

The node generates the second input integrity proofs, providing information about the block affiliation of the votes at the output regarding the blocks defined at the input and the re-encryption factor (the new random exponent) for the set of votes composing each block (since the encryption algorithm is ElGamal, the re-encryption factor per group is the result of adding the re-encryption factors of the votes composing each block).

The output integrity proofs at this node are generated by multiplying the re-encrypted votes at the output belonging to each block defined at the input.

The node generates zero knowledge proofs (for example, by using the Schnorr Identification Protocol) to demonstrate that, for each block, the output integrity proof is the re-encryption of the first input integrity proof.

Finally, the auditor verifies the zero knowledge proofs and proceeds to audit the following node repeating the same steps. Blocks of votes are redefined in the new node, in such a way that each new block contains a vote belonging to each block defined in the previous node.

REFERENCES

[Ab98] Masayuki Abe. Universally verifiable MIX with verification work independent of the number of MIX servers. In Nyberg [126], pages 437-447.

[Ch81] David Chaum. Untraceable electronic mail, return addresses, and digital pseudonyms. *Commun. ACM*, 24(2): 84-88, 1981.

[Ch04] David Chaum. *Secret-ballot receipts: True voter-verifiable elections*. IEEE SECURITY & PRIVACY Volume: 2, Issue: 1 Pages: 38-47, January-February 2004

[FOO92] A. Fujioka, T. Okamoto, and K. Ohta, "A practical secret voting scheme for large scale election", *Advances in Cryptology—Auscrypt '92*, LNCS 718, Springer-Verlag, pp. 244-260, 1992.

[Go02] Golle, P; Zhong, S; Boneh, D, et al. Advances in Cryptology—Asiacrypt 2002, Proceedings. Vol: 2501, Pages: 451-465. Published: 2002.

[JJR02] Markus Jakobsson, An Juels, and Ronald L. Rivest. Making mix nets robust for electronic voting by randomized partial checking. In Dan Boneh, editor, *USENIX Security Symposium*, pages 339-353. USENIX, 2002.

[Ne01] Andrew C. Neff. A verifiable secret shuffle and its application to evoting. In *CCS '01*, pages 116-125, 2001.

[PIK94] Choonsik Park, Kazutomo Itoh, and Kaoru Kurosawa. Efficient anonymous channel and all/nothing election scheme. In Tor Helleseth, editor, *EUROCRYPT*, volume 765 of *Lecture Notes in Computer Science*, pages 248-259. Springer, 1994.

[SK95] Kazue Sako and Joe Kilian. Receipt-free mix-type voting scheme—a practical solution to the implementation of a voting booth. In Louis C. Guillou and Jean-Jacques Quisquater, editors, *EUROCRYPT*, volume 921 of *Lecture Notes in Computer Science, pages* 393-403. Springer, 1995.

The invention claimed is

1. A method for the verification of the correct decryption of a set of encrypted messages, characterized by using an encryption algorithm with homomorphic properties to encrypt the messages, and in that said verification is based on the proof that the result of operating blocks of encrypted messages with an addition or multiplication operation $\phi$ is equal to the encryption of the result of operating the decrypted messages from the same blocks with an addition or multiplication operation $\Theta$, wherein the method comprises the following phases:

a. Individual encryption of each message of the total set of messages by one or more sources, by means of a public key from an asymmetric cryptographic algorithm with homomorphic properties, such that the operation $\phi$ of encrypted messages results in the encryption of the operation $\Theta$ of the messages;

b. Generation of a first input integrity proof based on the operation $\phi$ of phase a) and done over blocks (subsets) of the total set of messages encrypted in phase a);

c. Decryption of the messages encrypted in phase a) using a private key related to the encryption public key from phase a) obtaining a list of decrypted messages;

d. Generation of an output integrity proof based on the operation of blocks of messages decrypted in phase c) with the operation $\Theta$, where the blocks match those defined in phase b);

e. Generation of a second input integrity proof relating the first input integrity proof of the blocks of messages encrypted in phase a) with the output integrity proof of the blocks of messages decrypted in phase c); and f. Verification of the correct decryption of the set of messages encrypted in phase a) by comparing the output integrity proof generated from the blocks of decrypted messages generated in phase d) and the first input integrity proof generated from the blocks of messages encrypted in phase a), related by the second input integrity proof generated in phase e).

2. A method, according to claim 1, characterized in that homomorphic properties of the cryptographic algorithm are either additive or multiplicative.

3. A method, according to claim 2, characterized in that the algorithm used in phase a) is from the group comprising ElGamal, ElGamal with message exponentiation or Paillier.

4. A method, according claim 3, characterized in that the operation $\phi$ is the product of the components of the cipher text obtained after message encryption, and the operation $\Theta$ is an arithmetic addition or a product.

5. A method, according to claim 2, characterized in that the algorithm used in phase a) is based in elliptic curves.

6. A method, according to claim 5, characterized in that the operation φ is the addition of points of an elliptic curve and the operation Θ is an arithmetic addition or a product.

7. A method, according to claim 1, characterized in that the first input integrity proof in phase b) is composed by a set of first input integrity proofs, each one being calculated from a block of messages encrypted in phase a).

8. A method, according claim 7, characterized in that the blocks of encrypted messages over which the first input integrity proofs are generated, are generated by randomly distributing messages from the set of encrypted messages in the different blocks, in such a way that the same encrypted message is not present in two different blocks.

9. A method, according to claim 7, characterized in that the first input integrity proof generated from each block is calculated by operating with φ the set of encrypted messages composing that block.

10. A method, according claim 1, characterized in that the decryption operation from phase c) is done by a decryption process which preserves the anonymity of the sources that have encrypted the messages.

11. A method, according to claim 10, characterized in that said source anonymity preserving decryption process is a decryption, re-encryption or re-encryption with partial decryption Mixnet.

12. A method, according to claim 11, characterized by generating an intermediate integrity proof over blocks of the set of output messages transformed by a Mix-node, which are used as input for the following Mix-node.

13. A method, according to claim 12, characterized in that this intermediate integrity proof is generated over blocks of transformed messages in the node receiving these messages, in the node sending them, or in both nodes.

14. A method, according to claim 13, characterized in that each different block of transformed output messages over which the intermediate integrity proof is generated contains the same messages than the same block of input messages generated to calculate the first input integrity proof or the intermediate input integrity proof, after being transformed.

15. A method, according to claim 12, characterized in that the second input integrity proof contains the value of the transformation applied to the messages of each block from which the first input integrity proof or the intermediate input integrity proof has been generated.

16. A method, according to claim 15, characterized in that the value of the transformation contains the identification of the transformed messages belonging to each block over which the first input integrity proof has been generated, and the re-encryption, decryption or re-encryption with partial decryption value applied to the set of messages from each block.

17. A method, according to claim 15, characterized by executing the verification phase f) over the integrity proof generated from the blocks of input messages received in a node and over the integrity proof generated from the blocks of output messages from the same node, by generating a proof of the transformation done by such node that can be used to demonstrate that the integrity proof generated from each block of output messages is a transformation of the integrity proof of input messages of the same block.

18. A method, according to claim 13, characterized in that the way blocks over which the intermediate integrity proofs of the transformed messages received by a Mix-node are defined, is done by selecting at least one message from each one of the different blocks that where defined from the same transformed messages in the previous Mix-node.

\* \* \* \* \*